United States Patent [19]

Mueller

[11] Patent Number: 4,773,851
[45] Date of Patent: Sep. 27, 1988

[54] TUNNEL KILN ADAPTED FOR FIRING FROST-RESISTANT BRICKS IN A REDUCING ATMOSPHERE

[75] Inventor: Max Mueller, Senden, Fed. Rep. of Germany

[73] Assignee: Hans Lingl Anlagenbau und Verfahrenstechnik GmbH & Co. KG, Fed. Rep. of Germany

[21] Appl. No.: 74,022

[22] Filed: Jul. 16, 1987

[30] Foreign Application Priority Data

Aug. 9, 1986 [DE] Fed. Rep. of Germany ....... 3627050

[51] Int. Cl.[4] ............................................. F27D 19/00
[52] U.S. Cl. ........................................ 432/48; 432/77; 432/144; 432/159; 432/136; 432/241; 432/242
[58] Field of Search ............... 432/241, 242, 133, 136, 432/77, 144, 159, 81, 48

[56] References Cited

U.S. PATENT DOCUMENTS

| | | | |
|---|---|---|---|
| 2,736,943 | 3/1956 | Cremer | 432/241 |
| 2,899,189 | 8/1959 | Matis et al. | 432/241 X |
| 3,108,351 | 10/1963 | Hermans | 432/77 X |

FOREIGN PATENT DOCUMENTS 212791 8/1984 German Democratic Rep. .
3234858C2 1/1985 Fed. Rep. of Germany .

Primary Examiner—Edward G. Favors
Attorney, Agent, or Firm—Nixon & Vanderhye

[57] ABSTRACT

Cermic materials (i.e. architectural face-bricks) are fired in a tunnel kiln of the type having a firing zone and a downstream cooling zone. The cooling zone is segregated into indirect and direct cooling zones via a sealed gate structure therebetween. The heated gases in the indirect cooling zone are thus preliminarily cooled by suitable means (for example, a heat exchanger) and the cooled gases are returned via a closed-loop path to the indirect cooling zone. The fired ceramic materials in the direct cooling zone are finally cooled by the direct introduction of an oxygen-rich gas (i.e. ambient air). In such a manner, a reducing atmosphere may be maintained in the firing zone and in the indirect cooling zone while final cooling of the bricks occurs in the direct cooling zone. Thus, the oxygen-rich atmosphere of the direct cooling zone is prevented from entering the indirect cooling zone via the sealed gate structure thereby permitting frost-resistant bricks to be fired and cooled on a continual basis.

17 Claims, 1 Drawing Sheet

TUNNEL KILN ADAPTED FOR FIRING FROST-RESISTANT BRICKS IN A REDUCING ATMOSPHERE

BACKGROUND AND SUMMARY OF THE INVENTION

The present invention relates to tunnel kiln apparatus and method for firing ceramic materials (e.g. bricks), whereby, the ceramic materials may be preliminarily cooled after firing without subjecting them to an oxidizing environment (that is, firing and preliminary cooling of the bricks may be accomplished in a reducing atmosphere). As such, the present invention finds particular utility in the production of architectural face-bricks.

Conventionally, ceramic or refractory materials, such as bricks, tiles, and the like (hereinafter noted as bricks for ease of reference) are fired (i.e. cured) in a tunnel kiln whereby the uncured bricks are placed on kiln cars capable of sequential advancement in a train arrangement through the kiln tunnel. The kiln tunnel is itself defined by numerous zones, including a firing zone wherein flue gas from a combustion source is typically introduced into the kiln tunnel at a temperature sufficient to fire the bricks. The bricks are then subsequently cooled, for example, by introduction of ambient cooling air into a zone downstream of the firing zone.

Sometimes it is necessary for a reducing atmosphere to be maintained in the firing zone of the tunnel kiln, as for example, when architectural facing-bricks are produced. However, when firing bricks in a reducing atmosphere, the typical method of cooling the fired bricks by counterflow heat-exchange (i.e. directing cooling air through the tunnel kiln in a direction counter to the conveyance direction of the kiln cars) cannot be utilized. Hence, other techniques must be employed for cooling such bricks fired in a reducing atmosphere.

Reducing atmospheres are usually created in the firing zone of conventional tunnel kilns by the addition of excess fuel at a location towards the end of the firing zone while simultaneously reducing the amount of air flowing from the downstream cooling zone into the firing zone. This reduction of the amount of air flowing from the cooling zone into the firing zone is usually accomplished by reducing the amount of flue gas extracted in the transitional area between the firing and the cooling zones. However, reducing the amount of flue gases extracted from the transitional area between the firing and cooling zones brings about a concomitant required reduction in the amount of cooling air. Obviously, reducing the amount of cooling air will concurrently affect the rate at which the fired bricks are cooled thereby prolonging the bricks' production. Hence, according to conventional practice utilizing tunnel kilns of the type immediately described above, heat is removed from the bricks in the kiln's cooling zone during periodic cooling intervals. That is, the firing of bricks in a reducing atmosphere can only occur for a comparatively short time interval followed by long intervals of oxidation during which the tunnel kiln is operated under normal flow conditions and heat is removed from the bricks in the cooling zone.

Such conventional techniques also do not permit the reducing atmosphere in the firing zone to be contained within precisely defined boundaries since the reduction gases tend to burn up in the transitional area between the firing zone and the cooling zone. This occurrence, in turn, causes the bricks' surfaces to be reoxidized to an extent which cannot be controlled adequately.

According to the present invention, however, ceramic materials, such as bricks, can be fired continually in a reducing atmosphere without subsequent reoxidation occurring thereby resulting in a more consistent production of high quality frost-resistant bricks. In accordance with this invention, method and apparatus are provided whereby, in a tunnel kiln of the type having a firing zone and a downstream cooling zone, the cooling zone being further subdivided so as to establish indirect cooling and direct cooling zones. The indirect and direct cooling zones are partitioned one from the other by a gate seal structure which substantially precludes the oxygen-rich atmosphere of the direct cooling zone (as compared to the oxygen-depleted reducing atmosphere of the indirect cooling zone) from entering the indirect cooling zone. In such a manner, the uncured bricks may be fired and thereafter preliminarily cooled all in a reducing atmosphere.

Preferably, the indirect cooling zone defines a closed-loop cooling path for extracting heated kiln gas therefrom and then reintroducing cooled kiln gases back into the indirect cooling zone. Therefore, the tunnel kiln is capable of firing bricks in a reducing atmosphere within its firing zone without interruption (that is to say on a continual basis) while heat is simultaneously removed from the fired bricks in the cooling zone.

Further aspects and advantages of this invention will become clear after consideration is given to the detailed description thereof which follows.

BRIEF DESCRIPTION OF THE DRAWINGS

In the following detailed description of this invention, reference will be made to accompanying FIG. 1 which shows a schematic longitudinal cross-sectional view of a tunnel kiln embodying the present invention.

DETAILED DESCRIPTION OF THE INVENTION

Figure 1:
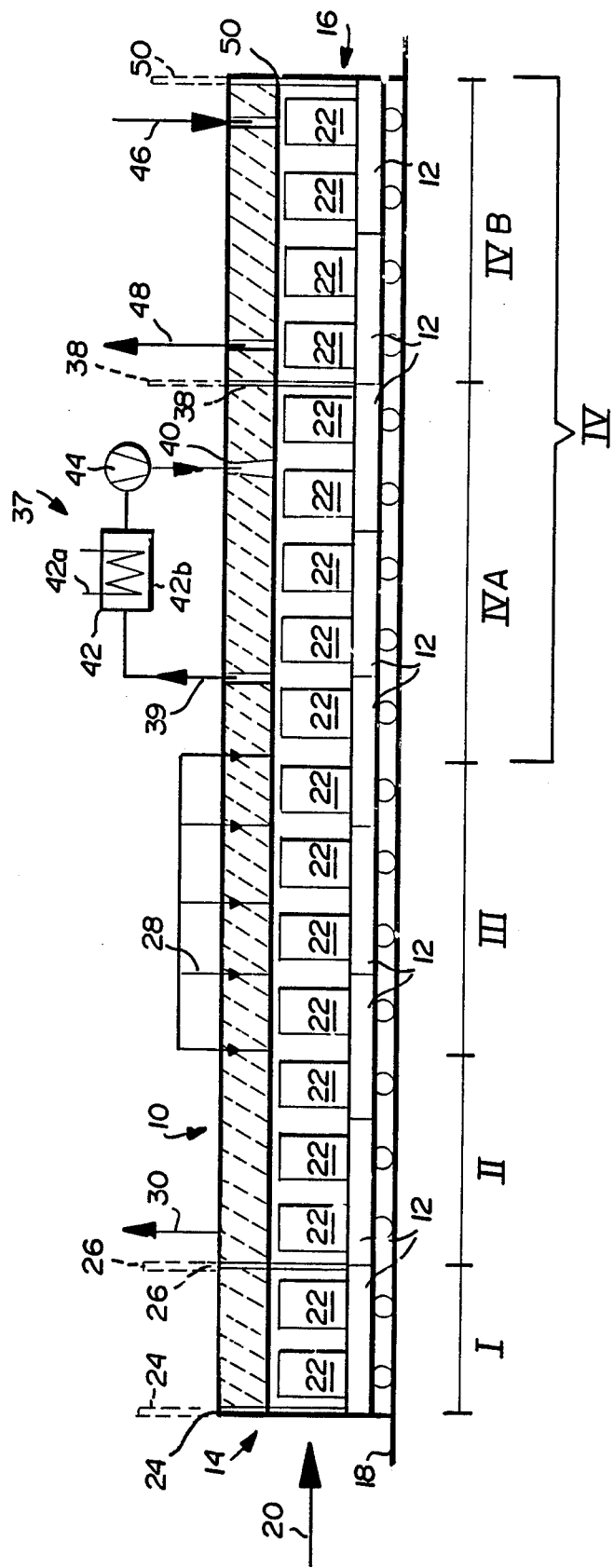

The preferred tunnel kiln 10 embodying the present invention is shown more clearly in accompanying FIG. 1. As is seen, kiln cars 12 are attached to one another in a successive manner as is well known so as to form a train-like procession. Kiln cars 12 are supported upon rails 18 for longitudinal movement through kiln 10 in the direction of arrow 20 between the kiln's entrance and exit ends 14, 16 respectively. Brick material 22 to be treated in kiln 10 is stacked upon, and thus supported by kiln cars 12. In such a well known manner, brick material 22 is conveyed through kiln 10 by means of kiln cars 27.

The kiln cars 12 are themselves sealed laterally by any suitable means well known to those in this art. For example, kiln cars 12 may be provided with lateral flanges or aprons which extend along the longitudinal sides of the cars 12 and the edges of which extend into a sand-filled channel skirting the kiln's side walls. In such a manner, a closed barrier is established extending the length of the kiln and substantially sealing the kiln car's undercarriage from its upper surface (on which the brick material 22 is stacked). Transverse joints between successive kiln cars 12 may likewise be sealed by means of, e.g., metal aprons or the like. Alternately, longitudinal sealing of cars 12 and undercarriage cooling may be provided in accordance with the teachings of copending and commonly owned U.S. patent application Ser.

No. 939,924 filed on Nov. 17, 1986(incorporated hereinto by reference).

Upon entry into tunnel kiln 10, the kiln cars encounter an entrance lock zone I transversely sealed at its upstream and downstream ends via gates 24, 26, respectively. A heat-up zone II is defined within kiln 10 upstream of firing zone III, the heat-up zone II serving to preliminarily heat the brick material 22 stacked upon kiln cars 12 occupying zone II by contact with flue gases being exhausted from zone II via exhaust port 30.

The firing zone III is provided with conventional burners 28 which introduce heated flue gas through the top or the sides of the tunnel kiln 10. Burners 28 are preferably of the type which can operate so as to fire the brick material 22 in either an oxidizing or reducing atmosphere so that kiln 10 can be used in a more versatile manner (although in the present invention, when used to produce architectural face bricks, burners 28 function to fire material 22 in a reducing atmosphere within zone III).

Immediately downstream of firing zone III there is defined a cooling zone IV comprised of an indirect cooling zone IVA and a direct cooling zone IVB. Indirect and direct cooling subzones IVA and IVB, respectively, are transversely sealed, and thus segregated, one from the other via gate 32. Gate 32 extends transverse relative to kiln cars 12 and, like gates 24 and 26, includes a metal apron (not shown) which contacts the upper surface of cars 12 upon which the brick material is supported to thereby establish a mechanical seal thereat. In operation, when it is desired to sequentially move kiln cars 12 along track 18 from one zone to the next, the gates 24, 26 and 38 are raised vertically (noted by dashed line in FIG. 1) so as to clear the top of material 22 so that the cars 12 may then be advanced in the direction of arrow 20. When the cars 12 have been advanced to their next sequential position within kiln 10, the gates 24, 26 and 38 are then lowered (shown by solid line in FIG. 1) so as to effect a seal between the gates' lower end and the upper surface of that kiln car 12 therebeneath.

As previously mentioned, the lateral sides of kiln cars 12 are sealed with respect to one another and with respect to the side walls of kiln 10. This sealed relationship thus substantially isolates that portion of tunnel kiln 10 within zone IVB from those portions (including firing and indirect cooling zones III, IVA, respectively) upstream thereof so that differing atmospheres may be established within the direct cooling zone IVB and the indirect cooling zone IVA.

The gases within the tunnel kiln 10 at indirect cooling zone IVA are cooled via a closed-loop cooling path 37 including a supply conduit 39 and a discharge conduit 40. A heat exchanger 42 is disposed between the supply and discharge conduits 39, 40, respectively, so as to cool the heated gases supplied via supply conduit 39 and to discharge cooled gases via the discharge conduit 40. Heat exchanger 42 may be of any conventional type, preferably a tube-in-shell type in which a heat exchange medium (such as oil) is circulated through the tubes 42a so as to extract heat from the gases flowing through the shell 42b. By way of example, the gases from indirect cooling zone IVA are cooled by heat exchanger 42 from a temperature of 500° C. (entering via conduit 39) to about 250° C. (discharged via conduit 40).

A fan 44 is operatively associated with the cooling loop 37 so as to cause the heated gases to be extracted from the indirect cooling zone IVA through conduit 39 and then to resupply the gases (cooled via heat exchanger 42) back into zone IVA through discharge conduit 40. In such a manner, the reducing atmosphere established in firing zone III can be maintained in the indirect cooling zone IVA, the closed-loop cooling path thereby permitting the gases within the indirect cooling zone IVA to be cooled without the introduction of an oxygen-rich gas (which would otherwise be the case if ambient air was utilized as the cooling medium as is the conventional practice). As such, the ceramic material 22 on kiln cars 12 may be fired in a reducing atmosphere on a relatively continuous basis without interruption.

The fired and preliminarily cooled ceramic materials 22 can then be transferred from indirect cooling zone IVA to direct cooling zone IVB. In direct cooling zone IVB, oxygen-rich gas (i.e. air at ambient temperature, e.g., about 15° C.) is introduced as a heat exchange medium via conduit 46 so as to provide direct final cooling of the fired ceramic material 22 on kiln cars 12. Air heated due to the heat exchange with material 22 is continuously withdrawn via discharge conduit 48 so that a counterflow (relative to the movement of cars 12 through kiln 10, i.e., counter to the direction of arrow 20) of cooling air is established within zone IVB.

When the ceramic material 22 on kiln cars 12 has been cooled a sufficient amount in direct cooling zone IVB, the cars 12 may then exit kiln 10 at end 16, the ceramic materials being off-loaded and the thus emptied kiln cars 12 being returned to the inlet end 14 of kiln 10 for the firing of additional uncured ceramic material. The exit end 16 of kiln 10 may optionally be provided with an exit gate 50 similar in construction and function to the gates 24, 26 and 38, previously described. That is, gate 50, like gates 24, 26 and 38, is capable of reciprocal vertical movements between raised and lowered positions (as noted by dashed and solid lines, respectively, in FIG. 1) so as to permit fired and cooled bricks on those kiln cars 12 adjacent exit end 16 to be removed from kiln 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of firing ceramic materials in a tunnel kiln of the type having a firing zone and a cooling zone downstream of said firing zone, said method comprising the steps of:
   (a) establishing, within said cooling zone, an indirect cooling zone and a direct cooling zone;
   (b) removing heated gas from said indirect cooling zone, cooling said removed gas, and then reintroducing said cooled gas into said indirect cooling zone;
   (c) exhausting heated gas from said direct cooling zone while directly introducing cooling gas thereinto; and
   (d) preventing said cooling gas in said direct cooling zone from entering said indirect cooling zone, whereby separate atmospheres are maintained in said indirect and direct cooling zones.

2. A method as in claim 1 wherein step (d) is practiced by providing a sealing gate which forms a seal transversely with kiln cars within said tunnel kiln.

3. A method as in claim 1 wherein step (b) is practiced by passing heated gases into a heat exchanger.

4. A method of cooling, in a reducing atmosphere, fired ceramic materials in a tunnel kiln having a cooling zone, said method comprising the steps of:
   (a) extracting heated gases from within said tunnel kiln;
   (b) cooling said extracted gases; and
   (c) returning at least a portion of said extracted and cooled gases to said cooling zone.

5. A method of firing architectural face-bricks in a reducing atmosphere;
   (a) firing uncured bricks in a reducing atmosphere within a firing zone of a tunnel kiln;
   (b) preliminarily cooling said fired bricks in an indirect cooling zone downstream of said firing zone while yet maintaining said reducing atmosphere therein by a closed-loop cooling path which (i) extracts heated gases from the indirect cooling zone, (ii) cools said extracted gases, and then (iii) reintroduces said cooled gases into said indirect cooling zone;
   (c) finally cooling said fired bricks in a direct cooling zone downstream of said indirect cooling zone by extracting heated gases therefrom and introducing cooling air thereinto, whereby to create an atmosphere within said direct cooling zone which is enriched with oxygen as compared to the atmosphere within said firing and indirect cooling zones; and
   (d) preventing said oxygen-enriched atmosphere of said direct cooling zone from entering said indirect cooling zone, whereby said reducing atmosphere is maintained within said firing and indirect cooling zones.

6. A method as in claim 5 wherein step (d) is practiced by providing a sealing gate which forms a seal transversely with kiln cars within said tunnel kiln.

7. A method as in claim 5 wherein step (b) is practiced by passing heated gases into a heat exchanger.

8. A tunnel kiln system having a cooling zone adapted to continuously cool fired ceramic materials in a reducing atmosphere, said kiln system comprising:
   (a) means for extracting heated gases from within said tunnel kiln;
   (b) means for cooling said extracted gases; and
   (c) means for returning at least a portion of said extracted and cooled gases to said cooling zone.

9. A tunnel kiln system as in claim 8 wherein said means for cooling includes heat exchanger means in fluid communication with said means for extracting and said means for returning, for cooling said extracted gases from a first temperature condition to a second temperature condition lower than said first temperature condition.

10. A tunnel kiln system as in claim 9 wherein said means for cooling cools said extracted gases from a first temperature condition of about 500° C. to a second temperature condition of about 250° C.

11. A tunnel kiln system as in claim 8 wherein said means for extracting and said means for returning includes fan means in communication with said means for cooling so that said extracted gases are subject to cooling thereby and, thereafter, returned to said tunnel kiln.

12. In a tunnel kiln of the type having kiln cars which are capable of passing through the kiln in a train formation from an entrance end to an exit end of the kiln, the improvement comprising:
   means for firing uncured ceramic material in a firing zone of the kiln;
   means for indirectly cooling kiln gases in an indirect cooling zone arranged downstream of said firing zone, thereby to preliminarily cool said fired ceramic material;
   means for directly cooling said ceramic material in a direct cooling zone arranged downstream of said indirect cooling zone; and
   partition means for partitioning said indirect and direct cooling zones, thereby to substantially preclude an atmosphere established in said direct cooling zone from contaminating an atmosphere established in said indirect cooling zone.

13. In a tunnel kiln of the type according to claim 12, the improvement wherein said means for indirectly cooling kiln gases includes means defining a closed-loop cooling path for said kiln gases, said cooling path having a supply conduit in fluid communication with said indirect cooling zone at a location adjacent said firing zone for extracting heated kiln gases from said indirect cooling zone, and a discharge conduit also in fluid communication with said indirect cooling zone and with said inlet conduit for reintroducing cooled kiln gases back into said indirect cooling zone.

14. In a tunnel kiln of the type according to claim 12, wherein said means for cooling said heated kiln gases includes a heat exchanger in fluid communication with said inlet and said discharge conduits.

15. In a tunnel kiln of the type according to claim 14, wherein said means for cooling said heated kiln gases includes fan means for extracting said heated kiln gases from said indirect cooling zone via said supply conduit, passing said heated kiln gases to said heat exchanger whereby said gases are cooled, and then reintroducing said cooled gases back into said indirect cooling zone via said discharge conduit.

16. In a tunnel kiln of the type according to claim 12, wherein said partition means is a partition gate capable of movements between a raised position which allows kiln cars to advance within said kiln and a lowered position which thereby establishes a transverse seal with a kiln car located therebeneath.

17. In a tunnel kiln of the type according to claim 16, wherein said entrance and exit ends are closed by means of entrance and exit gates, respectively.

* * * * *

UNITED STATES PATENT AND TRADEMARK OFFICE
CERTIFICATE OF CORRECTION

PATENT NO. : 4,773,851

DATED : September 27, 1988

INVENTOR(S) : MUELLER

It is certified that error appears in the above-identified patent and that said Letters Patent is hereby corrected as shown below:

First page, under ABSTRACT, first word, "Cermic" should be --Ceramic--.

Signed and Sealed this

Twenty-eighth Day of March, 1989

Attest:

DONALD J. QUIGG

Attesting Officer

Commissioner of Patents and Trademarks